US008504873B1

(12) United States Patent
Deolasee

(10) Patent No.: US 8,504,873 B1
(45) Date of Patent: *Aug. 6, 2013

(54) METHOD AND APPARATUS FOR PROVIDING IN-MEMORY CHECKPOINT SERVICES WITHIN A DISTRIBUTED TRANSACTION

(75) Inventor: Pavan Vijaykumar Deolasee, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/346,391

(22) Filed: Jan. 9, 2012

Related U.S. Application Data

(63) Continuation of application No. 10/880,383, filed on Jun. 29, 2004, now Pat. No. 8,095,826.

(51) Int. Cl.
    *G06F 11/00* (2006.01)
(52) U.S. Cl.
    USPC .................................. 714/19; 714/15
(58) Field of Classification Search
    None
    See application file for complete search history.

(56) References Cited

U.S. PATENT DOCUMENTS

| | | | | |
|---|---|---|---|---|
| 5,586,312 A * | 12/1996 | Johnson et al. | | 1/1 |
| 5,680,610 A * | 10/1997 | Smith et al. | | 1/1 |
| 5,768,587 A * | 6/1998 | Freund et al. | | 718/101 |
| 5,875,291 A * | 2/1999 | Fox | | 714/15 |
| 6,088,659 A * | 7/2000 | Kelley et al. | | 702/62 |
| 6,157,927 A * | 12/2000 | Schaefer et al. | | 1/1 |
| 6,199,068 B1 * | 3/2001 | Carpenter | | 1/1 |
| 6,272,675 B1 * | 8/2001 | Schrab et al. | | 717/100 |
| 6,526,416 B1 * | 2/2003 | Long | | 1/1 |
| 2002/0194244 A1 * | 12/2002 | Raventos | | 709/101 |

OTHER PUBLICATIONS

Wang et al., "Integrating Checkpointing with Transaction Processing", 1997, IEEE.*
Chen, Graham, "Distributed Transaction Processing Standards and their Applications", 1995, Computer Standards and Interfaces 17, pp. 363-373.*
Kistijantoro, et al., "Component Replication in Distributed Systems: a Case study using Enterprise Java Beans", 2003 IEEE.*
Buchholz, et al., "Transaction Processing in a Mobile Computing Environment with Alternating Client Hosts", 2000, Research Issues in Data Engineering.*

* cited by examiner

*Primary Examiner* — Gabriel Chu
(74) *Attorney, Agent, or Firm* — Campbell Stephenson LLP

(57) ABSTRACT

A method and apparatus for performing in-memory checkpoint services as a callable resource within a distributed transaction. As such, in-memory checkpoint processes can be utilized by an application as the application would use any resource available to the computer network via a distributed transaction.

21 Claims, 4 Drawing Sheets

METHOD AND APPARATUS FOR PROVIDING IN-MEMORY CHECKPOINT SERVICES WITHIN A DISTRIBUTED TRANSACTION

CROSS-REFERENCE TO RELATED APPLICATIONS

This application is a continuation of U.S. patent application Ser. No. 10/880,383, entitled "Method and Apparatus for Providing In-Memory Checkpoint Services Within a Distributed Transaction", filed Jun. 29, 2004, now U.S. Pat. No. 8,095,826 naming Pavan Vijaykumar Deolasee as inventor. This application is assigned to Symantec Operating Corporation, the assignee of the present invention, and is hereby incorporated by reference, in its entirety and for all purposes.

BACKGROUND OF THE INVENTION

1. Field of the Invention

Embodiments of the present invention generally relate to highly available fault tolerant server networks, and more particularly, to a method and apparatus for providing in-memory checkpoint services within a distributed two-phase transaction.

2. Description of the Related Art

Modern computer networks generally comprise a plurality of user computers (referred to herein as client computers or clients) connected to one another and to a computer server via a communications network. To provide redundancy and high availability of computer services provided by a computer server, multiple computer servers may be arranged in a cluster of nodes forming a server cluster. The application software in such systems are executed in a distributed manner providing various services to many client computers. Many of these so-called enterprise applications must be highly available and therefore cannot tolerate downtime, either planned or unplanned. Whenever a failure does occur, the downtime must be as short as possible. To reduce the downtime and improve the process used to restart a failed application on another server, known as a failover process, applications periodically save critical memory and file state information to persistent storage using a technique known as checkpointing. The so-called checkpoint data is used to reinitialize the application whenever the application is required to be restarted on the same or another node within the computer network. The checkpoint data is stored in a common storage volume that is accessible to both the failed server and the new node. Though the process checkpointing improves the application's failover response, the technique requires shared storage between applications and processors such that the information that is stored for one application from one server can be accessed and used by another server that is used in the failover process.

Therefore, there is a need in the art for a method and apparatus for improving the availability and failover response in a computer network.

SUMMARY OF THE INVENTION

The invention provides a method and apparatus for performing in-memory checkpoint services as a callable resource within a distributed transaction. As such in-memory checkpoint processes can be utilized by an application as the application would use any resource available to the computer network. In operation, an application sends a call to a transaction manager to, in effect, request a distributed transaction to be instantiated. The transaction may involve a database update or other computer process to be performed by a network resource. Within the transaction call for the database update, a checkpoint subsystem is requested to perform checkpoint services. The transaction manager utilizes an XA interface (or other similar interface) to instantiate the utilization of at least one resource manager to perform the computer process and another resource manager to perform the in-memory checkpoint process. As such, the checkpoint subsystem is used by applications within a computer network via an XA interface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
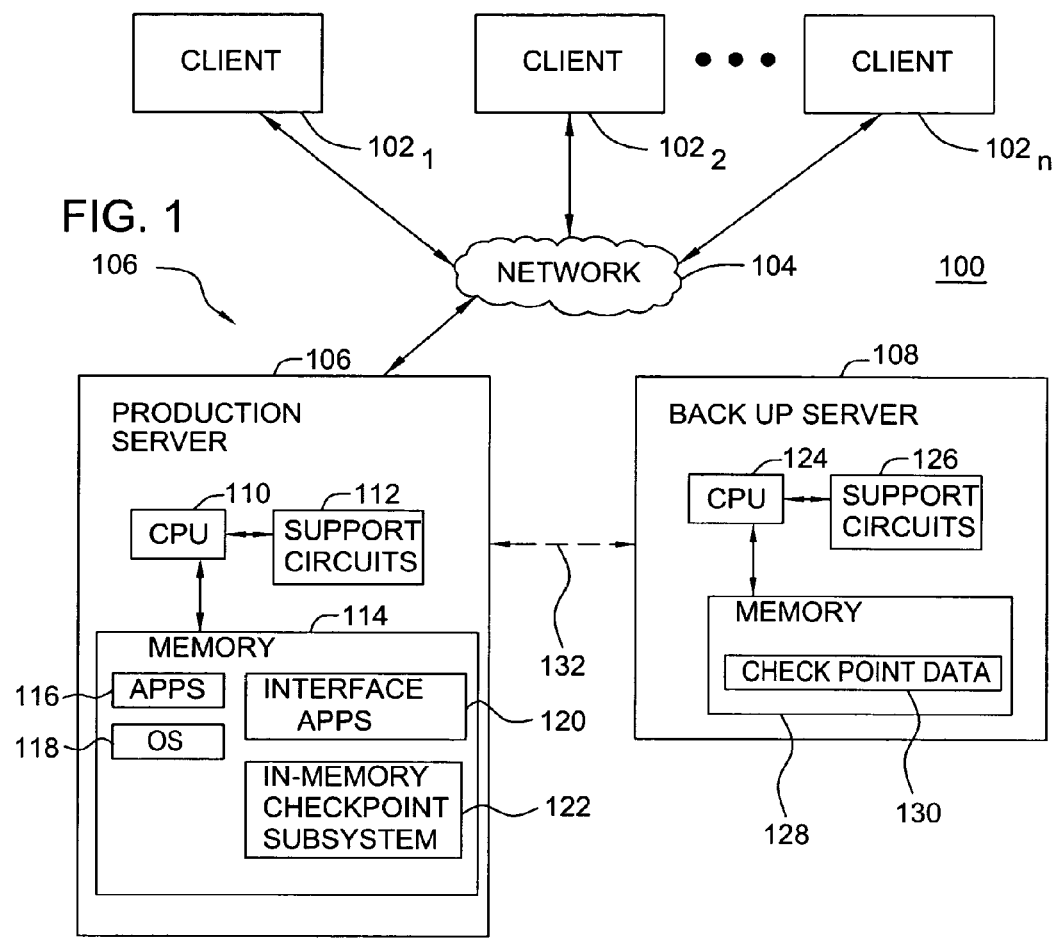
FIG. 1 is a block diagram of a computer network that operates in accordance with the present invention.

FIG. 1 depicts a computer network 100 comprising a plurality of client computers $102_1$, $102_2$, $102_3$, . . . $102_n$, a computer network 104, a production server 106 and a backup server 108. Although FIG. 1 depicts a single production server 106 and a single backup server 108, many networks, as those skilled in the art would realize, have a plurality of production servers and backup servers. In operation, the client computers will utilize enterprise software that runs upon the server 106 such that the server 106 provides computer resources of varying types to the clients $102_1$, $102_2$, . . . $102_n$. The backup server 108 is used to provide a location for the production server to backup checkpoint data as well as other backup files. The checkpoint data and backup files facilitate rapid failover of an application from the production server to another server or facilitate rapid restart of an application on the server 106.

The production server 106 comprises a central processing unit (CPU) 110, support circuits 112 and memory 114. The CPU 110 may be one or more of any type of computer processor. The support circuits 112 are well known in the art and include circuits such as clock circuits, input/output (I/O) circuits, cache, power supplies and the like. The memory 114 may comprise, but is not limited to, random access memory, read-only memory, disk drive storage, removable memory, remotely located storage arrays, optical storage systems, and combinations of these forms of memory. Various combinations of memory are generally used within the server environment to provide storage for data, files and applications. The memory 114 stores various types of information and software, including application programs 116, an operating system 118, application program interfaces (APIs) 120, and an in-memory checkpoint subsystem 122. In an enterprise computer network, this information and software may be stored and executed on separate servers or combinations of servers.

The backup server 108 is configured in a similar manner to the production server 106. Specifically, the backup server 108 comprises a CPU 124, support circuits 126, and memory 128. The memory 128 stores all of the information that is supplied as backup information from the production server 106. In connection with this particular invention, checkpoint data 130 is stored in the backup server 108. The production server 106 and the backup server 108 may be connected through network 104. However, more typically, the backup server 108 and the production server 106 are connected by a private network 132 to facilitate rapid transfer of backup information and restoration of this information when necessary.

Figure 2:
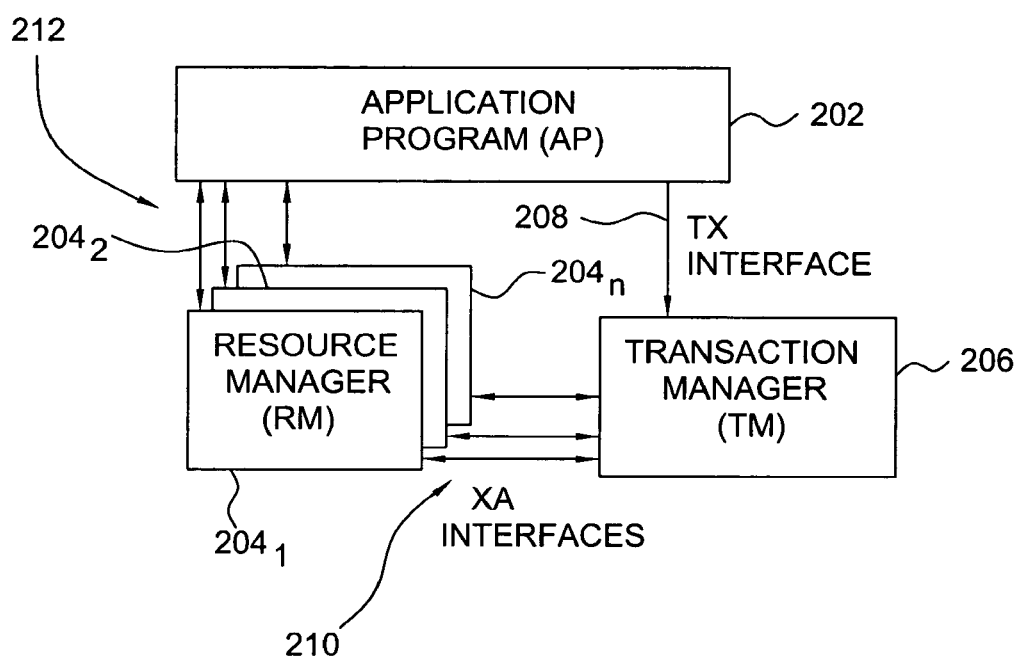
FIG. 2 depicts a functional block diagram of a distributed transaction.

FIG. 2 depicts a functional block diagram of a distributed transaction 200. The distributed transaction 200 is initiated by an application program 202 that requests specific resources to be used to support the application. In the instance of the invention, one of these resources is the in-memory checkpoint subsystem. The in-memory checkpoint subsystem is used to capture critical memory and file state information of the production server when executing a particular application at a particular instant in time. This memory and state information is referred to herein as checkpoint data. The checkpoint data is captured by the in-memory checkpoint subsystem 122 and then the subsystem sends the checkpoint data to the backup server 108 as checkpoint data 130. In event of failure of the production server 106, the checkpoint data can be used to restart the application program 202 on a backup server and have the checkpoint data 130 used to initialize the application program 202 at a point in the application represented by the checkpoint data. If the application 202 crashes while executing, the checkpoint data 130 is used to restart the application on server 106 at or near the point of the crash.

To utilize the in-memory checkpoint subsystem 122 as a resource to the application program 202, a two-phase distributed transaction 200 is utilized. In a two-phase distributed transaction 200, the application program 202 calls for the use of a resource by establishing a TX interface 208 to transaction manager 206. The transaction manager 206 then utilizes at least one XA interface 210 to communicate with at least one resource manager $204_1, 204_2, \ldots 204_n$. The use of TX and XA interfaces 208 and 210 within distributed transactions is well known in the art and described in detail in "Distributed Transaction Processing: The XA Specification", X/Open CAE Specification, X/Open Company Ltd. (1991), and "X/Open Distributed Transaction Processing", X/Open Company Ltd. (1989-1996). The interfaces are established in the first phase and then, in the second phase, the transaction manager commits to the use of the interlaces. Although XA interfaces are described as useful interfaces to use in connection with the invention, other distributed transaction technologies such as J2EE or CORBA (Common Object Request Broken Architecture) have interfaces that may be utilized to support in-memory checkpoint services. Interlaces related to J2EE technology are described in "Java Transaction API (JTA) Specification", Version 1.0.1 B, Sun Microsystems Inc. (1999), and interfaces related to CORBA technology are described in "Transaction Service Specification" Version 1.4, Object Management Group (OMG), September 2003.

The application program 202 implements the desired function of the end user, e.g., a database update. Each application program 202 specifies the sequence of operations that involves resources such as data-bases and in-memory checkpoint subsystem services. The application program 202 defines the start and end of a transaction, access to the resources within transaction boundaries, and normally makes the decision whether to "commit" or "rollback" each transaction.

A transaction is a complete unit of work that may comprise many computational paths, including user interface, data retrieval, and communications.

These transactions are able to be rolled back i.e., undone. A human user may rollback the transaction in response to a real world event, such as a customer decision. Alternatively, a program can elect to rollback a transaction. For example, account number verification may fail or the account may fail a test of its balance. Transactions also rollback if a component of the system fails, keeping the system from retrieving, communicating, or storing data. As such, every distributed transaction software component subject to transaction control must be able to undo its work in a transaction, i.e., transactions must be able to be rolled back at any time. When the server determines that a transaction can complete without failure, the server commits the transaction enabling changes to shared resources take permanent effect.

The transaction manager 206 manages the transactions and coordinates the decision to start them as well as to commit them or roll them back. The transaction manager 206 also coordinates recovery activities of the resource managers $204_1, 204_2, \ldots 204_n$ when necessary, such as after a component fails.

The resource managers $204_1, 204_2, \ldots 204_n$ comprise a defined part of the computer network's shared resources. These resources may be accessed using services that each resource manager provides. Examples of resource managers are database management systems, in-point checkpoint services and file access methods such as X/Open ISAM, print servers. The resource managers $204_1, 204_2, \ldots 204_n$ structure all changes to the resources they manage as recoverable and atomic transactions. They allow the transaction manager 206 to coordinate completion of the transactions atomically with work performed by the resource managers $204_n$.

In some instances of distributed transactions, a communications resource manager (not shown) may be coupled to the transaction manager 206. The communications resource manager allows one instance of a resource session to access another instance either inside or outside the current transaction manager domain. Use of a communication resource manager is optional in relation to the utilization of an in-memory checkpoint subsystem as a resource within a computer network.

To facilitate interaction between the application program 202 and the transaction manager 206 as well as the resource managers $204_1, 204_2, \ldots 204_n$, the application program 202 utilizes a number of application programming interfaces (APIs). A first API is used to facilitate the interface 212 between the application program 202 and the various resource managers $204_1, 204_2 \ldots 204_n$ that provide the access to the resources for the application program 202. A second API known as the TX interface 208 provides the communication between the application program 202 and the transaction management facilitated by the transaction manager 206. For example, when the application program calls tx_begin ( ) the transaction manager 206 informs the participating resource managers 204 of the start of a transaction. After each request is completed, the transaction manager provides a return value to the application program via another TX interface 208 reporting back the success or otherwise of the TX call. The transaction manager 206 to resource manager interface, known as the XA interface 210, enables the transaction manager 206 to structure the operation of the resource managers 204 into transactions and coordinate completion or recovery of their tasks. The XA interface 210 is the bidirectional interface between the transaction manager 206 and the resource managers 204.

The functions of the applications program 202, the transaction manager 206 and the resource managers $204_1$, $204_2 \ldots 204_n$ may be performed on one or more servers. As such, the functionality is distributed to insure high availability and fault tolerance of network resources. By considering the in-memory checkpoint subsystem as a resource a common storage system to multiple servers is not required. Instead of common memory, the checkpoint data can be created, stored, backed up and recovered using distributed transactions.

Figure 3:
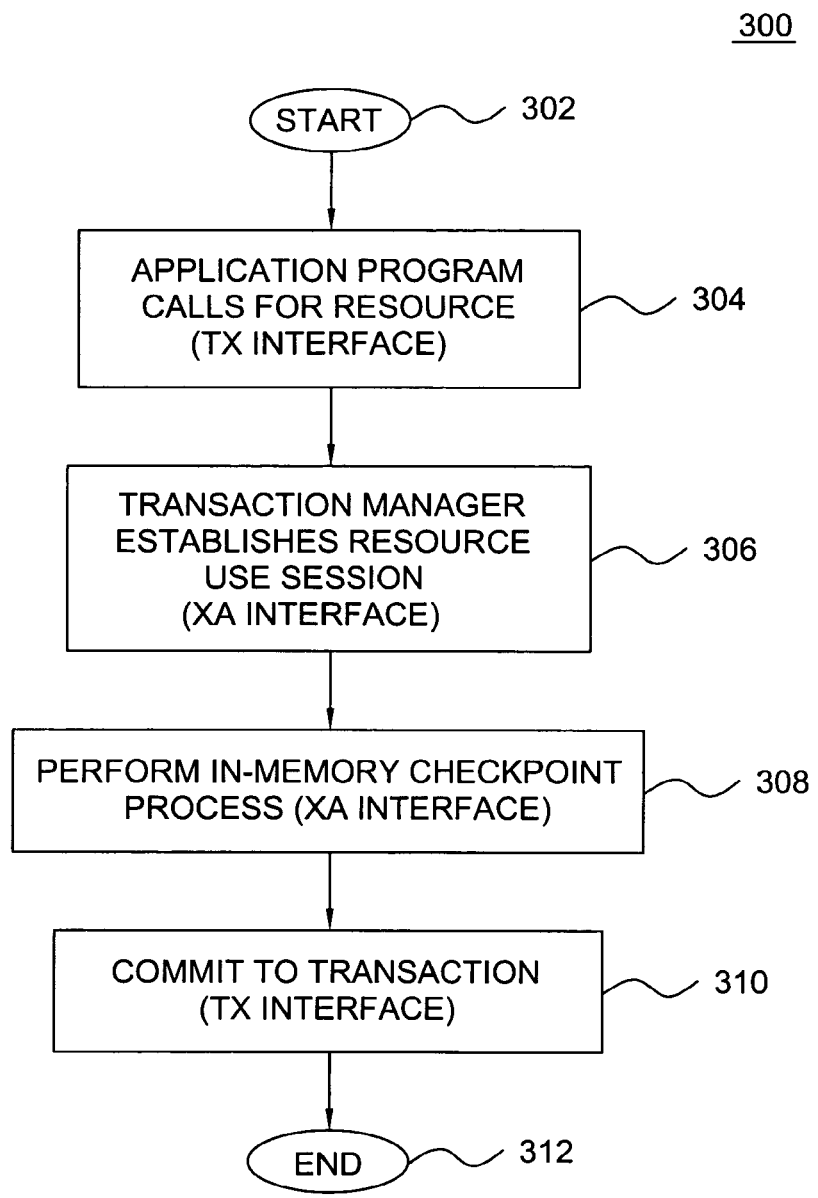
FIG. 3 depicts a flow diagram of a method for performing a distributed transaction involving an in-memory checkpoint process.

FIG. 3 depicts one example of a transaction in accordance with the present invention. The transaction represented by the flow diagram of FIG. 3 may also be represented in pseudo code as follows:

```
int
main {
    tx_begin ( );
    do database operation
    take in memory checkpoints
    tx_commit ( );
}
```

The transaction 300 is instantiated at step 302 and proceeds to step 304 where the application program calls for the use of a resource using the TX interface to the transaction manager. The typical TX interface that is used to start a resource use session is a tx_begin ( ) command. Other TX interface commands that are supported by the application would include tx_close, tx_commit, tx_open and tx_rollback. All of these TX interface commands are well known in the distributed transaction protocol art. See, for example, "Distributed Transaction Processing: The XA Specification", X/Open CAE Specification, X/Open Company Ltd. (1991), "X/Open Distributed Transaction Processing", X/Open Company Ltd. (1989-1996), and "Java Transaction API (JTA) Specification", Version 1.0.1B, Sun Microsystems Inc. (1999). Those skilled in the art should understand that other forms of interfaces may be used. Upon receiving a TX interface command, the transaction manager, at step 306, establishes a resource session using an XA interface. The resource that is used may be as simple as performing the in-memory checkpoint process. However, in most situations, another resource will be accessed, such as a database, a messaging service, and the like, where that resource will be updated and, as that resource is updated and/or utilized, the in-memory checkpoint information will be saved during the transaction that uses that resource. This process insures that a failure of the application or the server after the resource is used results in the checkpoint data being as up to date as possible and correspond to the latest transaction performed by the application. Thus, in transaction 300, it is assumed that the transaction manager establishes a first resource session for a resource such as a database operation using a first XA interface. Subsequently, the transaction manager performs the in-memory checkpoint process and, at step 308, establishes a second XA interface to the resource manager that handles the checkpoint process, e.g., the in-memory checkpoint subsystem.

The XA compliant resource manager that facilitates the in-memory checkpoint process supports at least the following interface commands: xa_close, xa_commit, xa_complete, xa_end, xa_forget, xa_open, xa_repair, xa_recover, xa_rollback, and xa_start. These XA compliant interface commands are well known in the art and are summarized in the following table:

TABLE 1

| Name | Description |
| --- | --- |
| ax_reg | Register a resource manager (RM) with a transaction manager (TM). |
| ax_unreg | Unregister an RM with a TM. |
| xa_close | Terminate the application program (AP's) use of an RM. |
| xa_commit | Tell the RM to commit a transaction branch. |
| xa_complete | Test an asynchronous xa_ operation for completion. |
| xa_end | Dissociate the thread from a transaction branch. |
| xa_forget | Permit the RM to discard its knowledge of a heuristically-completed transaction branch. |
| xa_open | Initialise an RM for use by an AP. |
| xa_prepare | Ask the RM to prepare to commit a transaction branch. |
| xa_recover | Get a list of XIDs the RM has prepared or heuristically completed. |
| xa_rollback | Tell the RM to roll back a transaction branch. |
| xa_start | Start or resume a transaction branch - associate an XID with future work that the thread requests of the RM. |

At step 310, the application commits the transaction using a tx_commit command via a TX interface. The transaction ends at step 312. In this manner, the transaction 300 calls for the resource, the resource such as a database update is performed, and simultaneously the in-memory checkpoint process is conducted. If no failures or other anomalies are detected, the transaction commits and performs the resource processes that were requested. As such, the checkpoint data and the resource utilization process are performed nearly simultaneously. This insures that any failover that occurs after the resource has been utilized will start the application program using checkpoint data that represent the most recent utilization of the application program.

Figure 4:
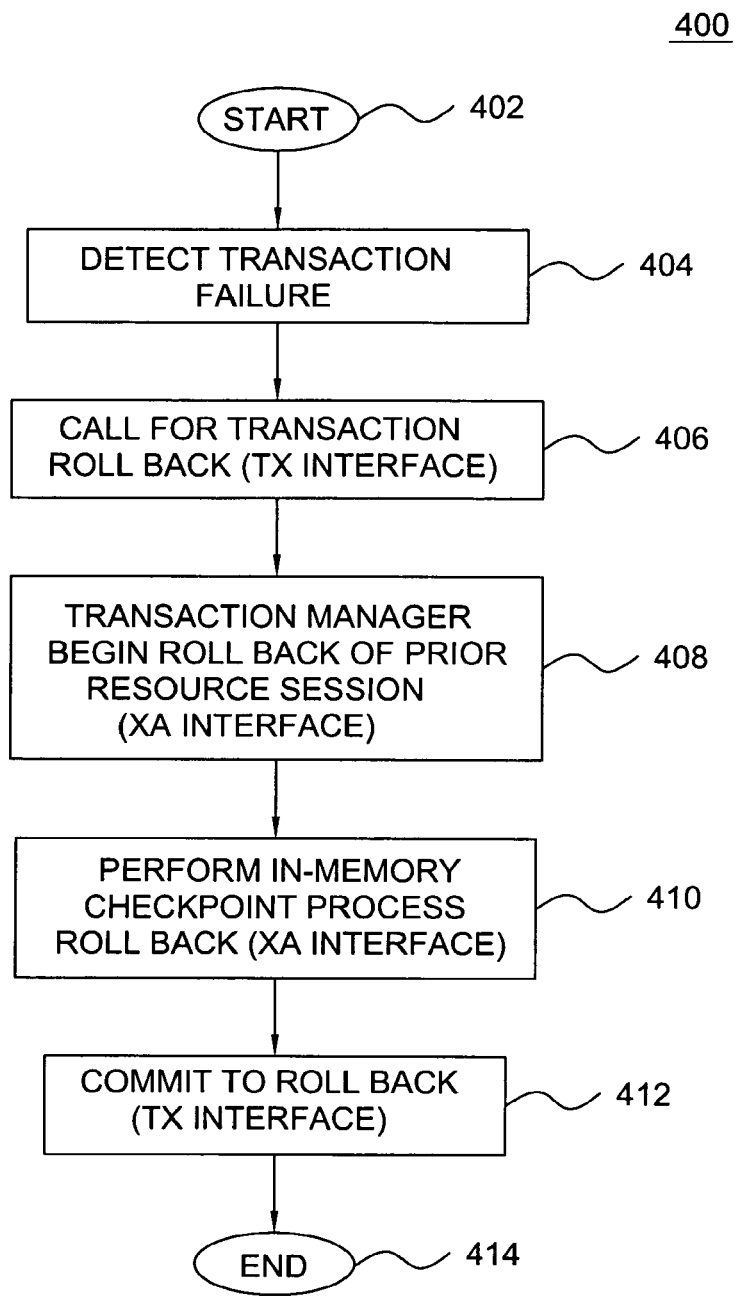
FIG. 4 is a flow diagram of a method of performing a roll-back function within a distributed transaction in accordance with the present invention.

If a transaction failure should occur, the transaction must be able to be rolled back. FIG. 4 depicts a flow diagram of a rollback process 400 wherein a transaction may be rolled back in accordance with the present invention. The process 400 begins at step 402 and proceeds to step 404 where a transaction failure is detected. Upon detection of a transaction failure, the application calls, at step 406, for a transaction rollback using a TX interface. At step 408, the transaction manager begins to rollback the process by establishing an XA interface through the appropriate resource managers. If the transaction manager is rolling back the process previously described with respect to FIG. 3, the database update will be rolled back at step 408 and then the in-memory checkpoint process will be rolled back a step 410. As such, an XA interface is used for both the resource manager for the database update and the resource manager for the in-memory checkpoint process. At step 412, the process 400 commits to a rollback using a TX interface and the process ends at step 414.

Using the method and apparatus described herein, the in-memory checkpoint subsystem is utilized as a resource to any number of applications which are capable of utilizing a distributed transaction protocol. Consequently, in-memory checkpointing can be performed without using a commonly accessible storage subsystem for all of the applications that need to use the checkpoint process. As such, the checkpointing subsystem can be used by legacy application designed to use distributed transactions but not designed to use checkpoint processes.

While the foregoing is directed to embodiments of the present invention, other and further embodiments of the invention may be devised without departing from the basic scope thereof, and the scope thereof is determined by the claims that follow.

What is claimed is:

1. A method for performing distributed transactions, comprising:
   sending a first resource call from an application to a transaction manager, wherein
       the first resource call requests a first resource,
       the first resource comprises a database,
       the application executes on a server, and
       the first resource call is part of a first distributed transaction; and
   sending a second resource call from the application to the transaction manager, wherein
       the second resource call requests a second resource,
       the second resource comprises an in-memory checkpoint subsystem,
       the in-memory checkpoint subsystem is configured to store checkpoint data of the application,
       the checkpoint data comprises memory information of the application at a particular instant in time, and
       the second resource call is part of the first distributed transaction.

2. The method of claim 1, further comprising:
   receiving a report from the transaction manager, wherein
       the report indicates whether the first distributed transaction can complete without failure.

3. The method of claim 1, further comprising:
   establishing a resource session between the transaction manager and a resource manager, in response to the first resource call, wherein
       the resource manager is associated with the first resource.

4. The method of claim 3, wherein
   the first resource call comprises a request to perform a database update, and
   the resource manager supplies a database service to the application.

5. The method of claim 4, wherein the checkpoint data reflects the request to perform the database update.

6. The method of claim 3, wherein the resource session is established via an interface supported by at least one of J2EE, CORBA and X/Open.

7. The method of claim 1, further comprising:
   establishing a resource session between the transaction manager and a resource manager, in response to the second resource call, wherein
       the resource manager is associated with the second resource,
       the second resource call comprises a request to perform an in-memory checkpoint process, and
       the resource manager supplies an in-memory checkpoint service to the application.

8. The method of claim 7, wherein
   the in-memory checkpoint subsystem is configured to execute on the server, and
   the in-memory checkpoint subsystem is further configured to send the checkpoint data of the application to a backup server.

9. The method of claim 1, wherein the first distributed transaction is sent to the transaction manager via a TX interface.

10. The method of claim 1, further comprising:
    committing the first distributed transaction to the database and the in-memory checkpoint subsystem, in response to a determination that the first distributed transaction can complete without failure; and
    rolling back the first distributed transaction, in response to a determination that the first distributed transaction cannot complete without failure.

11. One or more non-transitory computer-readable media that store computer executable instructions, wherein one or more computer systems implement a method for performing distributed transactions in response to executing the instructions, the method comprising:
    sending a first resource call from an application to a transaction manager, wherein
        the first resource call requests a first resource,
        the first resource comprises a database,
        the application executes on a server, and
        the first resource call is part of a first distributed transaction; and
    sending a second resource call from the application to the transaction manager, wherein
        the second resource call requests a second resource,
        the second resource comprises an in-memory checkpoint subsystem,
        the in-memory checkpoint subsystem is configured to store checkpoint data of the application,
        the checkpoint data comprises memory information of the application at a particular instant in time, and
        the second resource call is part of the first distributed transaction.

12. The non-transitory computer-readable media of claim 11, wherein the method further comprises:
    receiving a report from the transaction manager, wherein
        the report indicates whether the first distributed transaction can complete without failure.

13. The non-transitory computer-readable media of claim 11, wherein the method further comprises:
    establishing a resource session between the transaction manager and a resource manager, in response to the first resource call, wherein
        the resource manager is associated with the first resource.

14. The non-transitory computer-readable media of claim 13, wherein
    the first resource call comprises a request to perform a database update, and
    the resource manager supplies a database service to the application.

15. The non-transitory computer-readable media of claim 14, wherein the checkpoint data reflects the request to perform the database update.

16. The non-transitory computer-readable media of claim 13, wherein the resource session is established via an interface supported by at least one of J2EE, CORBA and X/Open.

17. The non-transitory computer-readable media of claim 11, wherein the method further comprises:
    establishing a resource session between the transaction manager and a resource manager, in response to the second resource call, wherein
        the resource manager is associated with the second resource,
        the second resource call comprises a request to perform an in-memory checkpoint process, and
        the resource manager supplies an in-memory checkpoint service to the application.

18. The non-transitory computer-readable media of claim 11, wherein the first distributed transaction is sent to the transaction manager via a TX interface.

19. The non-transitory computer-readable media of claim 11, wherein the method further comprises:
   committing the first distributed transaction to the database and the in-memory checkpoint subsystem, in response to a determination that the first distributed transaction can complete without failure; and
   rolling back the first distributed transaction, in response to a determination that the first distributed transaction cannot complete without failure.

20. A system for performing distributed transactions, comprising:
   an application program executing on a server, wherein the application program is configured to
      send a first resource call to a transaction manager, wherein
         the first resource call requests a first resource,
         the first resource comprises a database, and
         the first resource call is part of a first distributed transaction; and
      send a second resource call to the transaction manager, wherein
         the second resource call requests a second resource,
         the second resource comprises an in-memory checkpoint subsystem,
         the in-memory checkpoint subsystem is configured to store checkpoint data of the application program,
         the checkpoint data comprises memory information of the application program at a particular instant in time,
         the second resource call is part of the first distributed transaction, and
         the application program is non-transitory; and
   the transaction manager, wherein the transaction manager is coupled to the application program by a first interface, and wherein the application program is configured to send the first distributed transaction to the transaction manager.

21. The system of claim 20, wherein
   the application program is configured to receive a report from the transaction manager, wherein
      the report indicates whether the first distributed transaction can complete without failure.

* * * * *